Dec. 30, 1958 R. C. CARLSON ET AL 2,866,868

RESET-TYPE STATION PROTECTOR

Filed Dec. 9, 1957

INVENTORS.
Robert C. Carlson
BY Walter W. Witte

Ooms, McDougall, Williams & Hersh
Attorneys

United States Patent Office 2,866,868

Patented Dec. 30, 1958

2,866,868

RESET-TYPE STATION PROTECTOR

Robert C. Carlson, Chicago, and Walter W. Witte, Cary, Ill., assignors to Cook Electric Company, Chicago, Ill., a corporation of Delaware Application December 9, 1957, Serial No. 701,565

2 Claims. (Cl. 200—88)

Figure 1:
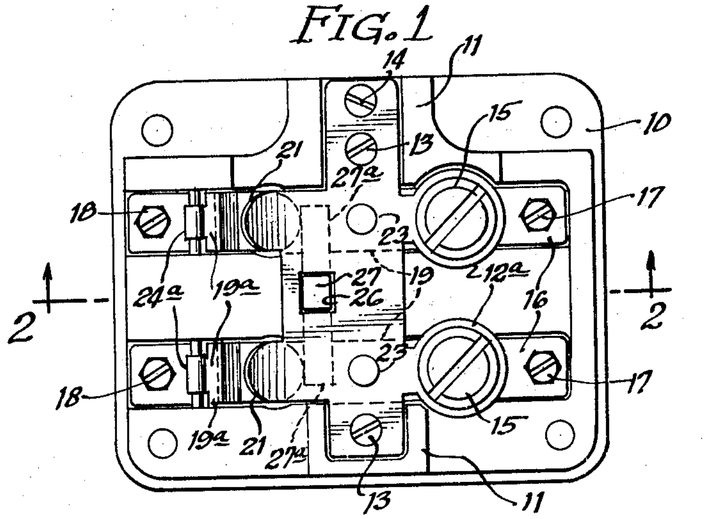

This invention relates to the field of protective devices for telephone circuits and is particularly addressed to a novel protective device which can be reset by the subscriber after an overload condition has been removed.

Normally, telephone lines are not characterized by either high voltages or heavy currents. Because abnormal conditions sometimes impress severe overloads on telephone circuits, however, it is necessary that each subscriber's installation be provided with a suitable protective device. (Circuits at central switchboard installations are similarly protected; however, the present invention is of particular utility in subscriber installations.)

A suitable protective device for a telephone installation should contain safeguards against two types of circuit overload—excessive voltage and excessive current. Lightning surges are illustrative of high-voltage overloads. Such surges are of relatively short duration, and they invariably involve very large peak voltages. A suitable safeguard against such phenomena is a spark-gap arrangement by which both sides of the line are connected to ground through a normally open circuit which will break down and hence ground the line whenever the voltage on the line is dangerously high.

Excessive-current overloads occur in telephone installations whenever a low-impedance current source, such as power lines, are inadvertently "crossed" with telephone circuits. This type of overload can occur as the result of storms, earth quakes, and other natural phenomena which damage power lines and cause them to fall across cables carrying telephone circuits. Similar effects sometimes result from faulty power wiring in buildings having telephone installations.

In the past it has been customary to protect telephone circuits against heavy-current overloads by placing fuses in the respective sides of the incoming telephone line. The passage through such fuses of an abnormal current for a predetermined interval of time will cause the fuses to melt and hence open the circuit, relieving the telephone instruments and local wiring from the overloaded condition.

Since telephone fuses cannot normally be replaced by the subscriber himself, the occurrence of an overload of this type on a subscriber's line normally results in the line's being out of order until such time as a maintenance man is able to call and replace the fuses. Thus the telephone instrument may well be out of service for a day or two, even though the overload condition be removed within a few minutes.

By the present invention, we have provided a station protector which can be reset by the subscriber himself, without exposing the subscriber to any risk of shock and without exposing any of the telephone circuitry to the subscriber's access. The principal object of the present invention is to provide such an apparatus.

Another feature and object of the present invention is to provide a telephone protective device which is very simply and compactly constructed, with a minimum of parts and with an usually compact assembly.

Still another object of the invention is to provide a telephone protective device affording both high-voltage and excessive-current protection wherein replacement of the high-voltage protective elements is particularly simple of accomplishment, whenever necessary.

Other objects and advantages of the invention will appear from the following detailed description of a typical embodiment thereof.

Figure 2:
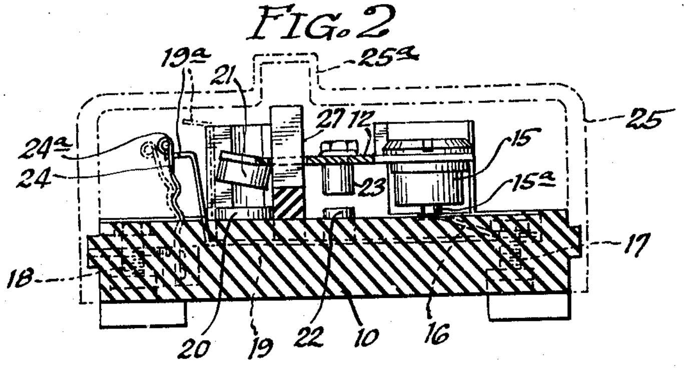
Figures 3, 4:
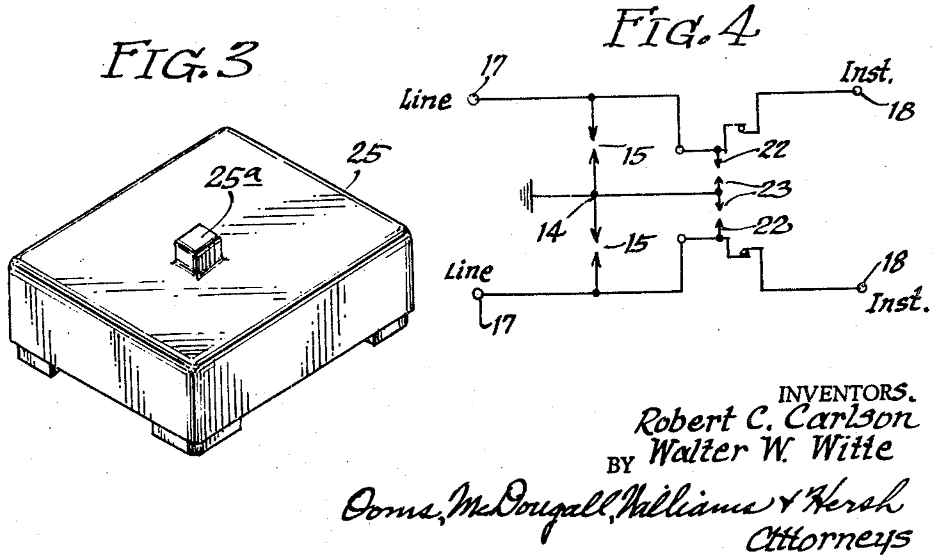

In the appended drawing, Figure 1 is a plan view of a typical embodiment of our invention as it appears with the protective cover removed. Fig. 2 is a sectional view of the Fig. 1 embodiment taken along the line 2—2 of Fig. 1 and showing in dotted outline the manner in which the protective cover fits over the instrument. Fig. 3 is a perspective view of the Fig. 1 instrument as it appears with the cover in position. Fig. 4 is a schematic diagram showing the internal electrical wiring of the Fig. 1 apparatus.

The protective device illustrated in the drawings is mounted on a molded base plate 10 formed of insulating material such as Bakelite. The base 10 is recessed on its upper surface to accommodate the various circuit elements presently to be described, and it has a pair of inwardly projecting bosses 11 which provide support for a flat punched metal ground plate 12. Ground plate 12 is secured to the bosses 11 by any suitable means, such as mounting screws 13, and a suitable screw terminal 14 is provided at one side extremity of plate 12 to serve as a convenient means for attaching a grounding connector to the plate 12. Preferably, the lower extremity of the screw terminal 14 passes through the under side of base member 10 and carries a nut by which a lug can be secured to the screw 14. Since these last-mentioned components are conventional, they are not shown.

As may be seen from Fig. 1, the ground plate 12 is shaped generally like the letter H with the cross bar extended, the mounting screws 13 and the grounding terminal 14 being carried in the cross-bar extensions. Two of the depending legs of the ground plate 12 are modified at **12*a* to provide apertured receptacles which carry spark-gap protective devices 15**. These devices may be of the type sold under the trademarks "Mytigap" or "Minigap," consisting in either case of enclosed spark gaps which are normally non-conducting but which are designed to conduct when the voltage across their terminals exceeds a predetermined value.

The spark-gap elements 15 are preferably of the self-restoring type, which automatically return to a non-conducting condition after the end of a surge. They may, however, be of the type which are not self-restoring.

One terminal of the spark-gap elements 15 is formed by the metal shell and mounting screw by means of which they are secured to the ground plate 12. The other terminal **15*a* of the gap elements 15 is brought out from the under side of the casing, and they bear against contact springs 16 which are secured to the base member 10 by terminal screws 17**.

As the schematic circuit diagram (Fig. 4) shows, the terminals 17 constitute the "line" terminals of the protective device. The "instrument" terminals, marked 18, are mounted in the base member 10 at the end opposite terminals 17.

Also secured to base 10 by means of terminal screws 17 are a pair of spring arms 19 which extend transversely of the base member 10, passing under the gap elements 15 and terminating at their forward ends in raised latch portions marked **19*a***.

Secured to the upper surface of each of the spring arms 19, immediately behind the latch portions **19*a*, are a pair of small permanent magnets 20. Above the magnets 20** and spaced away therefrom are a pair of similar small magnets 21 which are suitably mounted in any desired manner on the ground plate 12, as may be seen in Figs. 1 and 2. The respective magnets 20 and 21 are so arranged as to present opposite magnetic poles to one another, resulting in a magnetic attractive force being exerted between the respective pairs of magnets 20, 21.

Also mounted on the spring arms 19, about midway between the latch portions 19*a* and the terminals 17, are electric contact members 22, which may be made of silver-plated copper or other suitable material. Positioned on the ground plate 12 immediately above the contacts 22 are a pair of cooperating contacts 23. Contacts 23 are conductively joined to the ground plate 12 and serve as grounding contacts for the line when the current-sensitive protective means presently to be described has tripped responsively to excessive current.

Mounted on the instrument terminals 18 are bimetallic arms 24, carrying at their upper extremities cylindrical terminal members 24*a* which normally engage the respective ends of the latch positions 19*a* of spring arms 19. The upright bimetallic arms 24 are slotted immediately below the terminals 24*a*, as indicated in Fig. 2, to receive the ends of latch members 19*a*.

As may be seen in Fig. 2, the spacing between the respective contacts 22 and 23 is somewhat less than the spacing between the facing magnets 20 and 21.

Carried in a suitable non-circular aperture 26 in plate 12, midway between the depending legs of the plate, is a plunger 27, made of insulating material and formed generally in the shape of an inverted T. The stem of the plunger 27 extends upward substantially above the ground plate 12 and the cross bar 27*a* of the plunger 27 is disposed transversely of the spring arms 19, at least partially overlying both of them, as indicated in dotted lines in Fig. 1.

For our telephone protective device we provide a flexible plastic cover 25 which is dimensioned to form a snap fit over the base plate 10. In the portion of the cover 25 which directly overlies plunger 27 the cover is molded to provide a raised zone 25*a* of sufficient size to receive the plunger 27 whenever it is in the raised position presently to be described. In the formation of the raised zone 25*a*, the plastic of cover 25 is drawn somewhat so as to provide walls which are thinner and hence more flexible than the remainder of the cover.

In operation, our protective device is installed with a suitable ground bus connected to terminal 14, with the incoming telephone line connected to terminals 17, and with the local telephone instrument or instruments connected to the terminals 18. In normal operation, the latches 19*a* are held under the cooperating terminals or catches 24*a*, so that a closed circuit is provided between each of the terminals 17 and the corresponding terminal 18.

Under those normal conditions, the contacts 22 are respectively separated from the contacts 23, so that there is no connection to ground from either side of the telephone line.

Should a heavy voltage surge appear on the line, such as might be caused by lightning, the gap elements 15 will fire across, become conducting, and hence ground the line via terminal 14. If the gap elements 15 are of the preferred self-restoring type, this grounding action will terminate after the surge is over, and the instrument will automatically be restored to service.

Should an overload in the form of excessive current appear on the line, with voltage insufficient to fire across the gap elements 15, the heat thereby generated in the bimetallic elements 24 will cause them to bend backward, as indicated by dotted lines in Fig. 2, and thereby release the latch members 19*a*. When this happens, the spring arms 19 will immediately rise, urged by their own resilience and by the magnetic attraction between the respective magnets 20 and 21. This movement will at once produce two electrical consequences—the circuit between line terminals 17 and instrument terminals 18 will be interrupted, and the line terminals 17 will at once be grounded via contacts 22 and 23. It will be understood that abutment of the contacts 22 and 23 will limit upward movement of the arms 19, so that the magnets 20 and 21 can never actually touch one another.

Upward movement of the spring arms 19 will raise the plunger 27, bringing its upward end into the raised zone 25*a* of the cover 25.

The characteristics of the bimetal elements 24 will of course be designed to provide circuit-opening action responsively to whatever current conditions are considered excessive for the particular application in which our protective devices is being used.

After the abnormal conditions which produced an excessive-current overload have been removed from the line, the telephone instrument can be restored to service by the subscriber himself merely by applying manual pressure to the raised zone 25*a* of the cover 25. This portion of the cover being flexible, pressure on it will push the plunger 27 downward and re-latch the spring arms 19 under the terminals 24*a* of the bimetal elements 24.

While the foregoing description has assumed that the excessive current was flowing through both sides of the line 17, it will be appreciated that our protective device will operate equally well to protect the telephone instruments against overloads of the type involving only one side of the line. In the event of such an overload, only one of the spring arms 19 will be unlatched by movement of a bimetallic element 24, and only the affected side of the line will be grounded. Resetting of the instrument after such an overload may be accomplished in the same manner as previously described.

Many of the details of our instrument may be modified without departing from the spirit of our invention. Thus, for example, the magnets 20 and 21 may if desired be replaced by coil springs or other suitable means insuring that the spring arms 19 will rise into line-grounding position whenever the latches 19*a* are released.

Similarly, the means employed for holding the plunger 27 in position may be modified. If it be desired to make the shaft of the plunger 27 circular in cross section, any suitable guide means may be provided to hold the plunger 27 against rotational movement while leaving it free to move up and down.

Other such modifications will doubtless occur to readers skilled in the art.

It will be understood that the embodiment of our invention herein described in detail is intended merely to be illustrative, and it is our desire that the scope of the invention be measured primarily by reference to the appended claims.

We claim:

1. In a protective device for telephone subscriber circuits, the combination comprising a base, a pair of line terminals and a pair of instrument terminals carried thereby, electrically conductive means supported by said base and carrying a pair of fixed electrical contacts thereon, an electrical terminal conductively connected to said electrically conductive means and adapted to receive an external ground connection, a pair of resilient electrically conductive arms mounted on said base below the aforesaid electrically conductive means, said arms being respectively connected to one of said pairs of terminals and being anchored against movement at one end, an electrical contact element on each of said arms respectively positioned for cooperation with one of the aforementioned fixed contacts on said electrically conductive means, a pair of heat-responsive latch means mounted on said base and respectively connected electrically to the other of said pairs of terminals, said latch means being electrically conductive and being positioned normally to engage and bear against the free ends of said arms, and being operative responsively to heat exceeding a predetermined quantity to move away from and hence to unlatch said arms, magnetic means carried at least in part by said arms operative to urge said arms upward when unlatched and thereby to cause the contacts on said arms to engage said fixed contacts on said electrically conductive means, a plunger formed of insulating material and adapted in response to downward manual pressure thereon to re-latch said arms, and an integral molded-plastic cover for said device shaped to fit snugly over said base, said cover having a raised local zone positioned to receive a portion of said plunger, said local zone being thinner than the remainder of said cover and sufficiently flexible to permit application of manual re-latching pressure to said plunger by force applied externally to said zone and transmitted therethrough to said plunger.

2. The combination defined in claim 1 having also spark-gap means connected between each of said line terminals and said electrically conductive means.

References Cited in the file of this patent

UNITED STATES PATENTS

| | | |
|---|---|---|
| 968,395 | Parker | Aug. 23, 1910 |
| 2,478,541 | McCracken | Aug. 9, 1949 |
| 2,769,882 | Vitus | Nov. 6, 1956 |